Feb. 10, 1931.  C. D. YOUNG  1,792,055
CONTAINER HANDLING SYSTEM
Filed Sept. 17, 1928   2 Sheets-Sheet 1
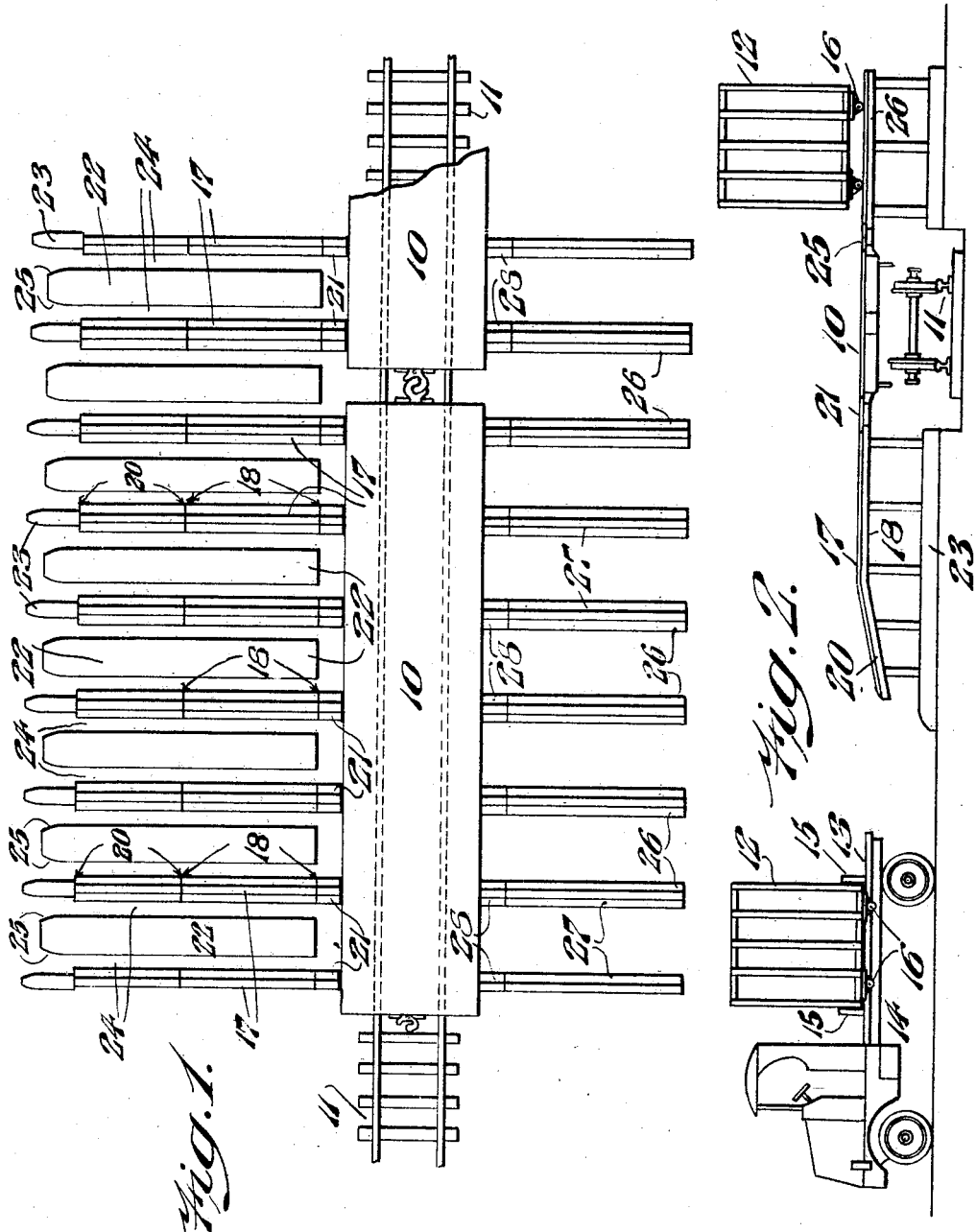

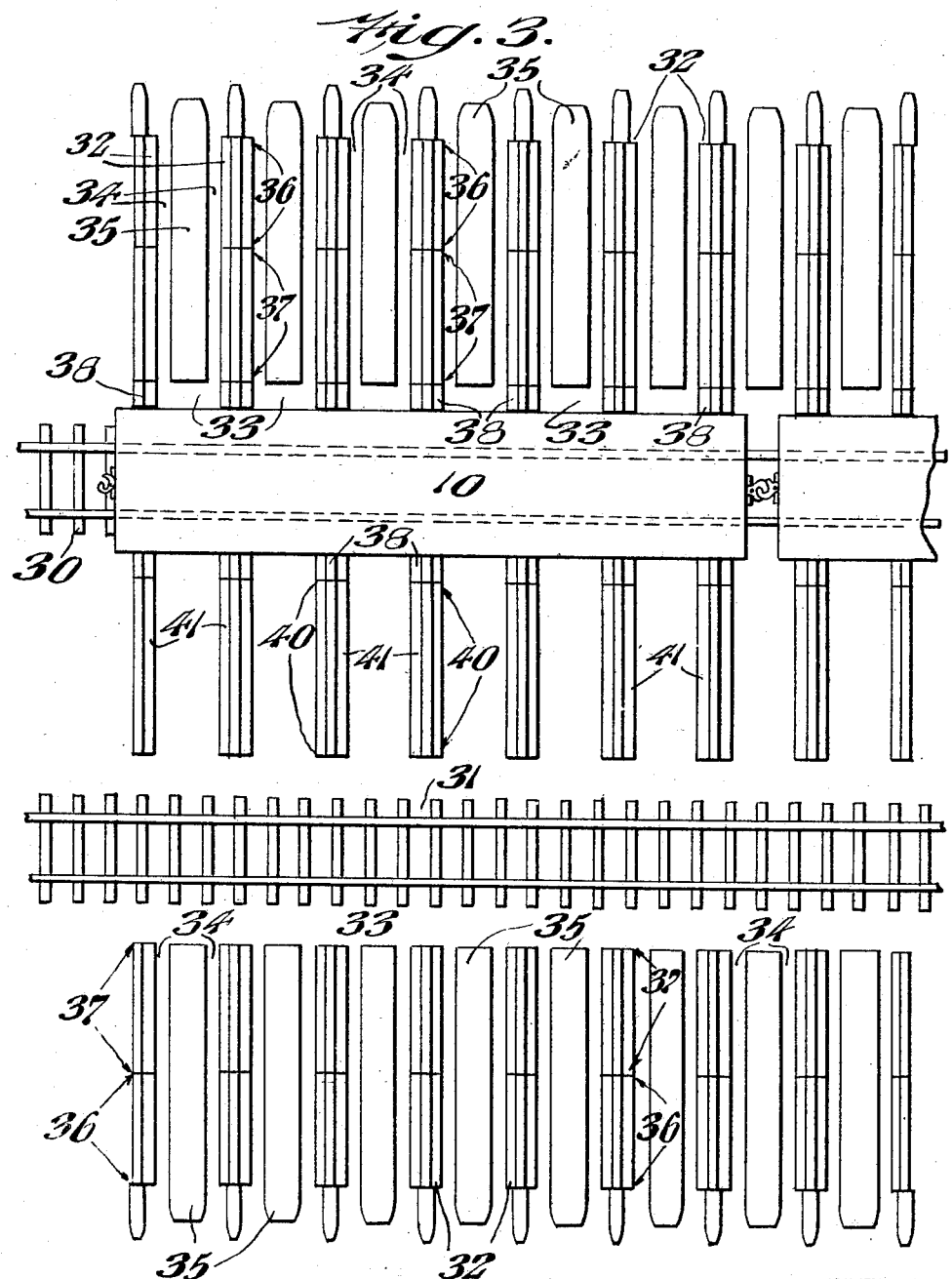

Patented Feb. 10, 1931

1,792,055

UNITED STATES PATENT OFFICE

CHARLES D. YOUNG, OF WAYNE, PENNSYLVANIA

CONTAINER-HANDLING SYSTEM

Application filed September 17, 1928. Serial No. 306,549.

The present invention relates to article handling apparatus and more particularly to the handling of large containers for merchandise and other commodities.

Some of the objects of the present invention are to provide an efficient and economical system for unloading containers from motor trucks and loading them upon railroad cars and vice versa; to provide a system wherein bulk containers of a prohibitive weight for manual handling can be quickly transferred from one place to another with a minimum of manual labor; to provide an improved system for loading and unloading railroad cars of the flat type; to provide a railroad loading system wherein provision is made for increasing the storage facilities at the loading and unloading station; to provide a container handling system for use with both single and multiple track railways; and to provide other improvements as will hereinafter appear.

In the accompanying drawings, Fig. 1 represents a plan of a container handling system embodying one form of the present invention as applied to loading and unloading flat cars upon a single railroad track; Fig. 2 represents a side elevation of the same showing a truck ready to deliver a container; and Fig. 3 represents a plan of the system as applied to a double track loading station.

Referring to the drawings, one form of the present invention is shown as applied to the loading and unloading from a receiving platform such as that provided by flat cars 10 on a track 11 which may be a blind end siding, a passing siding, a branch line, or a part of the main track as the case may be.

Primarily the present system has to do with the handling and transportation of relatively large containers or packing cases which in filled condition weigh in the thousands of pounds and cannot ordinarily be loaded or unloaded without the aid of a number of men and usually special mechanical equipment. Such a container 12 is here shown on the platform 13 of the body of a truck 14 where it is locked in place in any suitable manner and also preferably abuts stop pins 15 which are removably seated in holes in the floor of the platform 13. The container 12 here illustrated by way of example has rollers or wheels 16 fore and aft which straddle the body platform 13 and besides supporting the container for movement from one location to another also serve a purpose to be presently described.

For transferring a container 12 from a truck 13 to a flat car 10, or vice versa, a pair of ramp rails 17 are mounted in parallel relation preferably at right angles to a track 11 with one end of each rail terminating in relatively close proximity to the side of the flat car 10. The supporting section 18 of the ramp rails 17 is substantially horizonal and for best results should lie in the plane of the receiving surface of the flat car, while the approach section 20 is inclined from a lower level upwardly to merge into the section 18. The lowermost end of this section 20 terminates below the horizontal plane of the container wheels 16 and each rail of this section 20 is located in the path of travel of one side set of the wheels 16. Thus when a truck 11 is backed towards unloading position the body of the truck rides freely between the pair of ramp rails 17 but the inclined section 20 of the latter is met by the wheels 16 so that the container 12 is lifted, first at one end and then at the other end, as the truck 11 continues to back into the space between the ramps 17 until the container is entirely removed from the truck 11 and rests upon the section 18. The pins 15 can now be removed and the truck is free to drive away leaving the container 12 resting upon the ramp section 18 ready to be pushed manually over upon the flat car 10. When a container is to be removed from the rails 17, a truck 21 is backed into the space between the rails and the pins 15 are placed in the platform at the rear of the container so that when the truck moves out the pins 15 cause the container to move along the rails and descend the ramp incline to be received upon the truck platform. The container is shown with roller wheels 16 but these may be omitted on the bottom of container and the latter skidded over the supports if desired.

In order to bridge the clearance between the side of the flat car 10 and the juxtaposed ends of the ramps 17, movable aprons 21 are provided, each being arranged to seat at one end on a supporting part of a ramp, and at the other end upon the flat car, thus forming an unbroken rail surface upon which the container can travel to its position upon the flat car 10, or in the reverse direction if the operation is an unloading one. To facilitate the transfer of the container from ramp support 18 or 27 to car 10 or vice versa, the motor truck may be used to push or pull the container from one to the other location. Or if the motor truck is not available other suitable means may be provided for the transfer. As many aprons 21 are provided as there are ramp rails and when the latter are single track ramps single track aprons are used, and when the latter are double track ramps double track aprons are used.

In the space between each pair of ramp rails 17 is an elongated floor abutment 22 having its sides respectively spaced from the respective rails support bases 23 to provide guideways 24 for the wheels of the vehicle whereby the latter can be accurately placed with respect to the rails 17 for automatic loading and unloading operations. At the entrance to the ramp spaces, the abutments 22 each have convergingly tapered curved ends 25 for more readily directing the vehicle wheels into the guideway 24.

When the present system is used with a single railroad track, extra storage space can be provided at the opposite side of the track from the receiving and delivering ramp rails 17 and consists of a storage section or sections 26 arranged at right angles to the track in position to readily receive and deliver containers from and to the cars 10. The ramp rails 27 of each storage section 26 are similarly arranged and located with respect to the car on the track rails to be loaded or unloaded and aprons 28 are provided for closing the clearance between the car body and the ends of the container supporting rails 27.

When the present system is used with double tracks 30 and 31, pairs of ramp rails 32 are arranged in parallel relation at the outside of each of the tracks 30 and 31 and at right angles thereto to form a series of vehicle receiving spaces 33 into which a vehicle can be directed by the guideways 34 formed by the respective centrally disposed abutments 35. Each pair of ramp rails 32 is made up of an inclined section 36 and a support section 37, the former being positioned in the path of the sides of a container located on the platform of a track body, as the latter is moved into the space 33 and hence raises the container and transfers it to the supporting section 37. From the supporting sections 37 the containers can be moved across the clearance spaces between the ends of the ramp rails and the car by using aprons 38 of either a removable or a pivoted type which in operative position provide a bridging surface flush with the floor of a car and with the ramp rail level.

The facilities of the loading and unloading station can be increased by the provision of a plurality of storage sections 40, each of which consist of a pair of ramp rails 41 spaced to receive and support opposite sides of the containers being handled and having a level in the plane of the floor of the car 10. These storage sections 40 are located between the tracks 30 and 31 and have a length which leaves a safety clearance between the respective ends of the rails and the tracks. These clearances are bridged at both ends of the storage sections 40 by the removable aprons 38 heretofore referred to. Thus a container or containers upon a flat car upon either track 30 or 31 can be transferred to a storage section 40 by bridging the space between the selected section and the car with two aprons 38, and the container so moved can either remain upon the section or shifted over to a car upon the other track. Thus a complete storage and container handling station is provided wherein both tracks of a railroad have automatic means for transferring containers from trucks to freight cars or vice versa, and from such cars to storage locations available between the tracks.

While but one ramp construction has been here described and may be so used at very small stations, it is to be understood that the system contemplates also a multiple arrangement and in the drawings such an extended use of ramps is shown, and the invention is not to be limited to a single ramp installation as obviously a plurality thereof increases the efficiency of the system and reduces the time, labor and cost of handling containers to a minimum. As distinguished from a single unit installation where single track ramps are employed, the multiple unit installation makes use of double track ramps, that is each pair of units has a common ramp structure mounting a rail having a track surface at each side thereof so that loading or unloading of a number of containers can take place simultaneously.

Having thus described my invention, I claim:

1. In a loading and unloading apparatus, a plurality of supporting frames arranged in parallel relation and at right angles to a receiving platform to form a series of vehicle receiving stalls, single tracks supported respectively by the two end frames each comprising a horizontal section adjacent said platform and a ramp section at the opposite end, and double tracks supported respectively by the frames between said end frames each comprising a horizontal section adjacent said platform and a ramp section at the opposite end.

2. In a loading and unloading apparatus, a plurality of supporting frames arranged in parallel relation and at right angles to a receiving platform to form a series of vehicle receiving stalls, single tracks supported respectively by the two end frames each comprising a horizontal section adjacent said platform and a ramp section at the opposite end, double tracks supported respectively by the frames between said end frames each comprising a horizontal section adjacent said platform, and single track aprons for bridging the space between said single tracks respectively and said platform.

3. In a loading and unloading apparatus, a plurality of supporting frames arranged in parallel relation and at right angles to a receiving platform to form a series of vehicle receiving stalls, single tracks supported respectively by the two end frames each comprising a horizontal section adjacent said platform and a ramp section at the opposite end, double tracks supported respectively by the frames between said end frames each comprising a horizontal section adjacent said platform, and double track aprons for bridging the space between said double tracks respectively and said platform.

4. In a loading and unloading apparatus, a plurality of supporting frames arranged in parallel relation and at right angles to a receiving platform to form a series of vehicle receiving stalls, single tracks supported respectively by the two end frames each comprising a horizontal section adjacent said platform and a ramp section at the opposite end, double tracks supported respectively by the frames between said end frames each comprising a horizontal section adjacent said platform, single track aprons for bridging the space between said single tracks respectively and said platform, and double track aprons for bridging the space between said double tracks respectively and said platform.

Signed at Philadelphia, county of Philadelphia, State of Pennsylvania, this 10th day of September, 1928.

CHARLES D. YOUNG.